United States Patent
He et al.

(10) Patent No.: US 10,386,632 B2
(45) Date of Patent: Aug. 20, 2019

(54) LENS, CAMERA, PACKAGE INSPECTION SYSTEM AND IMAGE PROCESSING METHOD

(71) Applicant: HANGZHOU HIKROBOT TECHNOLOGY CO., LTD, Hangzhou (CN)

(72) Inventors: Pinjiang He, Hangzhou (CN); Yong Zhu, Hangzhou (CN); Wencong Zhang, Hangzhou (CN); Mingqiang Xie, Hangzhou (CN); Da Guan, Hangzhou (CN); Zhenhua Zhang, Hangzhou (CN)

(73) Assignee: Hangzhou Hikrobot Technology Co., Ltd, Hangzhou (CN)

( * ) Notice: Subject to any disclaimer, the term of this patent is extended or adjusted under 35 U.S.C. 154(b) by 0 days.

(21) Appl. No.: 15/753,804

(22) PCT Filed: Jul. 20, 2016

(86) PCT No.: PCT/CN2016/090685
§ 371 (c)(1),
(2) Date: Feb. 20, 2018

(87) PCT Pub. No.: WO2017/028652
PCT Pub. Date: Feb. 23, 2017

(65) Prior Publication Data
US 2018/0284429 A1    Oct. 4, 2018

(30) Foreign Application Priority Data

Aug. 18, 2015    (CN) .......................... 2015 1 0508464

(51) Int. Cl.
*H04N 5/225* (2006.01)
*H04N 5/232* (2006.01)
(Continued)

(52) U.S. Cl.
CPC ......... *G02B 27/0075* (2013.01); *G02B 5/201* (2013.01); *G03B 11/00* (2013.01);
(Continued)

(58) Field of Classification Search
CPC .... G06T 7/557; G02B 27/0075; G02B 5/201; G02B 5/208; G03B 11/00; H04N 5/225; H04N 5/2254; H04N 5/23232
(Continued)

(56) References Cited

U.S. PATENT DOCUMENTS

| | | | |
|---|---|---|---|
| 8,102,599 B2 * | 1/2012 | DeCusatis | G02B 27/10 359/620 |
| 2003/0002867 A1 * | 1/2003 | Ojala | G03B 17/00 396/73 |

(Continued)

FOREIGN PATENT DOCUMENTS

| | | |
|---|---|---|
| CN | 101877763 A | 11/2010 |
| CN | 104486537 A | 4/2015 |

(Continued)

OTHER PUBLICATIONS

International Search Report (with English translation), dated Oct. 10, 2016, for PCT/CN2016/090685, 7 pages.

(Continued)

Primary Examiner — Marly S Camargo
(74) Attorney, Agent, or Firm — Seed IP Law Group LLP

(57) ABSTRACT

The present application discloses a lens, camera, package inspection system and image processing method. The lens comprises an optical lens and a photosensitive chip, and further comprises an optical filter comprising a first filter portion and a second filter portion and disposed between the optical lens and the photosensitive chip, wherein a first object point is imaged on the photosensitive chip through the optical lens and the first filter portion, and a second object (Continued)

point is imaged on the photosensitive chip through the optical lens and the second filter portion, the first filter portion having a thickness greater than that of the second filter portion. The technical problem of a lens in relevant art having a relatively small DOF is solved by the present application.

19 Claims, 12 Drawing Sheets

(51) Int. Cl.
*G06T 7/55* (2017.01)
*G02B 27/00* (2006.01)
*G02B 5/20* (2006.01)
*G03B 11/00* (2006.01)
*G02B 1/11* (2015.01)

(52) U.S. Cl.
CPC ........... *H04N 5/225* (2013.01); *H04N 5/2254* (2013.01); *H04N 5/23232* (2013.01); *G02B 1/11* (2013.01); *G02B 5/208* (2013.01)

(58) Field of Classification Search
USPC ............. 348/335, 224.1, 290, 360; 382/145; 396/209, 241; 359/308, 339, 359, 588
See application file for complete search history.

(56) References Cited

U.S. PATENT DOCUMENTS

| | | | |
|---|---|---|---|
| 2007/0035705 | A1 | 2/2007 | Hurd |
| 2007/0076105 | A1* | 4/2007 | Inokuma ................ H04N 9/083 348/273 |
| 2010/0277638 | A1* | 11/2010 | Bartle .................... H04N 5/225 396/73 |

FOREIGN PATENT DOCUMENTS

| | | |
|---|---|---|
| CN | 204859348 U | 12/2015 |
| JP | 2002314058 A | 10/2002 |
| JP | 2002-333574 A | 11/2002 |
| JP | 2014015542 A | 1/2014 |
| WO | 2013/061990 A1 | 5/2013 |

OTHER PUBLICATIONS

Supplementary European Search Report dated Apr. 15, 2019, for European Application No. 16 83 6516, 12 pages.

* cited by examiner

--Prior Art--

LENS, CAMERA, PACKAGE INSPECTION SYSTEM AND IMAGE PROCESSING METHOD

The present application claims the priority to Chinese patent application No. 201510508464.8, filed with the State Intellectual Property Office of People's Republic of China on Aug. 18, 2015 and entitled "LENS, CAMERA, PACKAGE INSPECTION SYSTEM AND IMAGE PROCESSING METHOD", which is incorporated herein by reference in its entirety.

TECHNICAL FIELD

The application relates to the field of machine vision, and in particular to a lens, camera, package inspection system and image processing method.

BACKGROUND

The depth of field (DOF) is an allowable distance range in front of and behind an object being shot in a case that it can be imaged clearly by the lens of a camera. In other words, when the lens of a camera focuses on an object, all the object points on the plane that is perpendicular to the optical axis of the lens (i.e., the object plane) can be imaged clearly on the receiver, and the points within a certain range in front of and behind the object plane can also be imaged relatively clearly. Such a range is referred to as the DOF of the camera. A larger DOF means that objects within a larger range can be imaged clearly. Therefore, control of DOF has a great practical significance in fields such as machine vision and video surveillance. FIG. 1 is a schematic view illustrating the DOF of a camera. As shown in FIG. 1, light emitted from an object at a nominal object distance is focused on a nominal image plane after passing through a lens. Light emitted from an object in front of or behind the nominal object distance will be focused in front of or behind the nominal image plane respectively after passing through the lens, and will produce a blur spot of a certain size on the nominal image plane. If the blur spot is small enough, the object can still be considered as having been imaged clearly. Therefore, objects between a near object distance and a far object distance in FIG. 1 can all be considered as having been imaged clearly. The axial distance between the near object distance and the far object distance is the DOF of the lens.

When the camera is shooting, the image of an object being shot may be blurred if parts of the object have different object distances and the variations thereof exceed the DOF of the camera. Or, in some scenarios (for example, intelligent transportation) where the camera has to be mounted in a tilted way with respect to the scene being monitored, since the scene targeted by the camera contains an object that is near and an object that is far, it may be impossible to focus on both clearly, i.e., it is impossible to guarantee that both objects are within the DOF of the camera, thus resulting in the image having a low definition.

Generally, there are 4 main factors affecting the DOF:

1) aperture of the lens: the smaller the aperture (i.e., the larger the aperture value (F#)), the larger the DOF;

2) focal length of the lens: the longer the focal length, the smaller the DOF; the shorter the focal length, the larger the DOF;

3) shooting distance: the longer the shooting distance, the larger the DOF; the shorter the shooting distance, the smaller the DOF;

4) pixel size of the photosensitive element: the larger the pixel size, the larger the DOF.

Generally, there is not much room for adjustment of the last three parameters once a camera is selected and the scene to be shot is determined. What can typically be changed is the aperture of a lens. Because of this reason, the aperture is reduced as much as possible under many imaging conditions requiring a larger DOF. But there are two problems with reducing the aperture. One is that light energy entering a photosensitive element decreases with the square of the aperture size decreasing, thus the image will become very dark when an aperture is too small; the other is that, if the aperture is small enough, light diffraction will become significant, thus image points that are originally imaged clearly will gradually become a larger blur spot, resulting in reduced definition of the image.

In relevant art, one approach is to increase the DOF of a camera by liquid lens focusing. Its principle lies in that the focal length of a liquid lens can be dynamically adjusted by a DC voltage. As the driving voltage changes, the focal point of the lens can move back and forth accordingly, so that the object on which the lens focuses can be controlled by voltage signals. The focusing manner is similar to that of human eyes, having the advantages of rapid response and long useful life, and the shortcomings of the lens being expensive and not suitable for wide-spread application. In addition, although a liquid lens zooms rapidly, it cannot recognize objects at different distances simultaneously during the shooting of the same image. Its scope of application is limited to some extent.

Another approach is to process image by deconvolution. The blurring of an image due to defocusing can be regarded, from the perspective of signal processing, as the result of a convolution operation of the point spread function of the defocused lens with the input image. As the point spread function of the defocused lens has a relatively simple mathematic model, it can be estimated and modelled in advance, and the input image can be restored by using the Wiener filtering method. Clear images for different object distances can be restored by using different deconvolution kernels after shooting a defocused image. This approach has the advantages of widely adaptability without the need for additional optical elements, and being able to obtain clear images for different object distances with one single image. However, the disadvantages are also obvious. First, the amount of computation of deconvolution is very large and needs to consume a large amount of computing resources, resulting in an increase in hardware cost. In addition, during the process of obtaining the deconvolution result, the noise in the image will also be amplified, resulting in a serious degradation of the image quality.

No effective solution has been proposed yet to solve the technical problem of a lens in relevant art having a relatively small DOF.

SUMMARY

The present application provides a lens, camera, package inspection system, and image processing method to solve at least the technical problem of a lens in relevant art having a relatively small DOF.

According to one aspect of the present application, a lens is provided, including an optical lens and a photosensitive chip, the lens further including: an optical filter including a first filter portion and a second filter portion and disposed between the optical lens and the photosensitive chip, wherein a first object point is imaged on the photosensitive chip through the optical lens and the first filter portion, and a second object point is imaged on the photosensitive chip through the optical lens and the second filter portion, the first filter portion having a thickness greater than that of the second filter portion.

In one specific implementation of the present application, the first portion and the second portion constitute a step-shaped structure.

In one specific implementation of the present application, the area ratio between the incidence plane of the first filter portion and that of the second filter portion is the ratio between the field of view of the distal region of DOF and that of the proximal region of DOF.

In one specific implementation of the present application, the optical filter includes a plurality of transparent flat optical filters, wherein the plurality of transparent flat optical filters are glued by an optical adhesive to form a step-shaped structure.

In one specific implementation of the present application, the optical filter includes a transparent optical filter with a step-shaped structure.

In one specific implementation of the present application, the optical filter is connected with a control component via a transmission component in order to be controlled and moved to a target position, wherein at the target position, the imaging optical path of the first object point goes through the first filter portion and the imaging optical path of the second object point goes through the second filter portion.

In one specific implementation of the present application, the surface of the photosensitive chip is provided with a protection glass, and the optical filter is glued to the surface of the protection glass.

In one specific implementation of the present application, the incidence plane and the exit plane of the optical filter are coated with an anti-reflection film and/or infrared cut-off film.

According to another aspect of the present application, a lens is further provided. The lens includes an optical lens and a photosensitive chip, and further includes: an optical filter disposed between the optical lens and the photosensitive chip, wherein a first object point is imaged on the photosensitive chip through the optical lens and the optical filter, and a second object point is imaged on the photosensitive chip through the optical lens.

In one specific implementation of the present application, the central axis of the optical filter is parallel to the optical axis of the optical lens and spaced from the optical axis by a predetermined distance.

In one specific implementation of the present application, the optical filter is connected with a control component via a transmission component in order to be controlled and moved to a target position, wherein at the target position, the imaging optical path of the first object point goes through the optical filter and the imaging optical path of the second object point does not go through the optical filter.

According to another aspect of the present application, a camera is provided. The camera includes any lens provided by the present application.

According to another aspect of the present application, a package inspection system is provided. The package inspection system includes any cameras provided by the present application.

According to another aspect of the present application, an image processing method is provided. The method includes: obtaining a first target image and a second target image respectively, wherein the first target image is a part of an image to be processed that is formed on a photosensitive chip through an optical lens and a first filter portion, and the second target image is a part of the image to be processed that is formed on the photosensitive chip through the optical lens and a second filter portion, wherein the image to be processed is an image of a target object to be detected shot with a lens including the optical lens, the photosensitive chip and an optical filter that is disposed between the optical lens and the photosensitive chip and including the first filter portion and the second filter portion, the first filter portion having a thickness greater than that of the second filter portion; determining whether there is any overlapping area between an image of the target object to be detected in the first target image and an image of the target object to be detected in the second target image; and, performing de-duplication to the overlapping area in the image to be processed if it is determined that there is an overlapping area between the image of the object to be detected in the first target image and that in the second target.

In one specific implementation of the present application, before obtaining the first target image and the second target image respectively, the method further includes: obtaining a first proportion and a second proportion respectively, wherein the first proportion is the proportion of the image of object to be detected in a first region of the image to be processed, and the second proportion is the proportion of the image of object to be detected in a second region of the image to be processed; determining if the difference between the first proportion and the second proportion reaches a predetermined threshold, wherein the first proportion is larger than the second proportion; and adjusting the position of the optical filter to increase the second proportion and re-obtaining the image to be processed if it is determined that the difference between the first proportion and the second proportion reaches the predetermined threshold.

In one specific implementation of the present application, adjusting the position of the optical filter to increase the second proportion includes: determining a target movement amount according to the first proportion, the second proportion, the area of the first region, and the area of the second region; and moving the optical filter towards a target direction by the target movement amount, wherein the target direction is the direction from the first region to the second region.

According to another aspect of the present application, an image processing method is further provided. The method includes: obtaining a first target image and a second target image respectively, wherein the first target image is a part of an image to be processed that is formed on a photosensitive chip through an optical lens and an optical filter, and the second target is one of the image to be processed that is formed on the photosensitive chip through the optical lens but not through the optical filter, wherein the image to be processed is an image of a target object to be detected shot with a lens including the optical lens, the photosensitive chip, and the optical filter which is disposed between the optical lens and the photosensitive and has a uniform thickness; determining whether there is any overlapping area between an image of the target object to be detected in the first target image and an image of the target object to be detected in the second target image; and performing de-duplication to the overlapping area in the image to be processed if it is determined that there is an overlapping area between an image of the target object to be detected in the first target image and an image of the target object to be detected in the second target image.

According to another aspect of the present application, an application program is further provided, the application program being configured for performing any of the image processing methods described above when being executed.

According to another aspect of the present application, a storage medium is further provided, wherein the storage medium is configured for storing an application program configured for performing any of the image processing methods described above when being executed.

As the lens provided in the present application includes an optical lens and a photosensitive chip, and further includes an optical filter comprising a first filter portion and a second filter portion and disposed between the optical lens and the photosensitive chip, wherein a first object point is imaged on the photosensitive chip through the optical lens and the first filter portion, and a second object point is imaged on the photosensitive chip through the optical lens and the second filter portion, the first filter portion having a thickness greater than that of the second filter portion, it solves the technical problem of a lens in relevant art having a relatively small DOF, and increases the DOF of the lens by disposing the optical filter with filter portions of different thicknesses between the optical lens and the photosensitive chip, so that objects corresponding to different object distances can be imaged clearly respectively on different areas of the surface of the photosensitive chip.

BRIEF DESCRIPTION OF THE DRAWINGS

Drawings described here are used to provide further comprehension of the present application and constitute a part thereof. Illustrative embodiments and description thereof serve as an explanation of the present application and should not be construed to unduly limit the present application. In the drawings.

DETAILED DESCRIPTION

A clear and complete description of technical solutions in embodiments of the present application is provided below with reference to drawings of embodiments so that the present application can be better understood by those skilled in the art. Obviously, the embodiments described are merely a part of but not all the embodiments of the present application. All other embodiments obtained by those skilled in the art without creative efforts shall fall within the protection scope of the present application.

It should be noted that, terms such as "first", and "second" in the specification, claims, and drawings of the present application are configured to distinguish similar objects but not necessarily configured to describe a specific sequence or order. It should be appreciated that such numbers are interchangeable in appropriate situations so that the embodiments of the present application described herein can be implemented in other sequences than those illustrated or described herein. In addition, terms such as "include", "have" and any variation thereof are intended to represent a non-exclusive inclusion. For example, processes, methods, systems, products or devices including a series of steps or units are not necessarily limited to those steps or units explicitly listed, but may include other steps or units that are not explicitly listed or intrinsic to these processes, methods, systems, products or devices.

A lens is provided below according to an embodiment of the present application.

Figure 1:
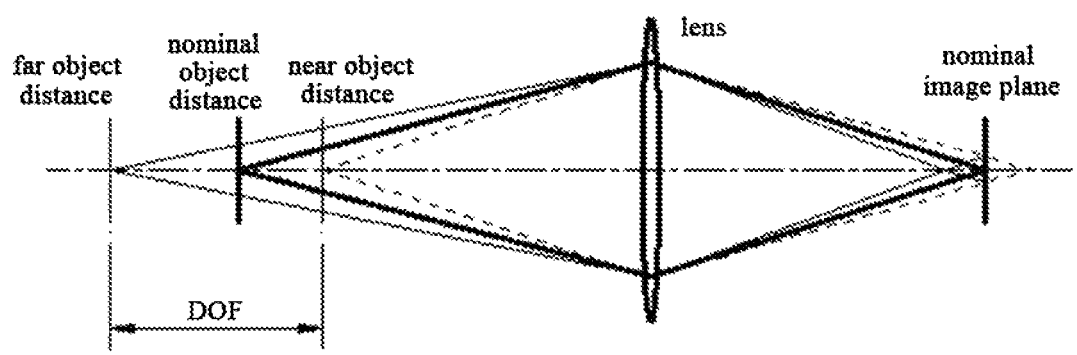
FIG. 1 is a schematic view illustrating the DOF of a camera.
Figure 2:
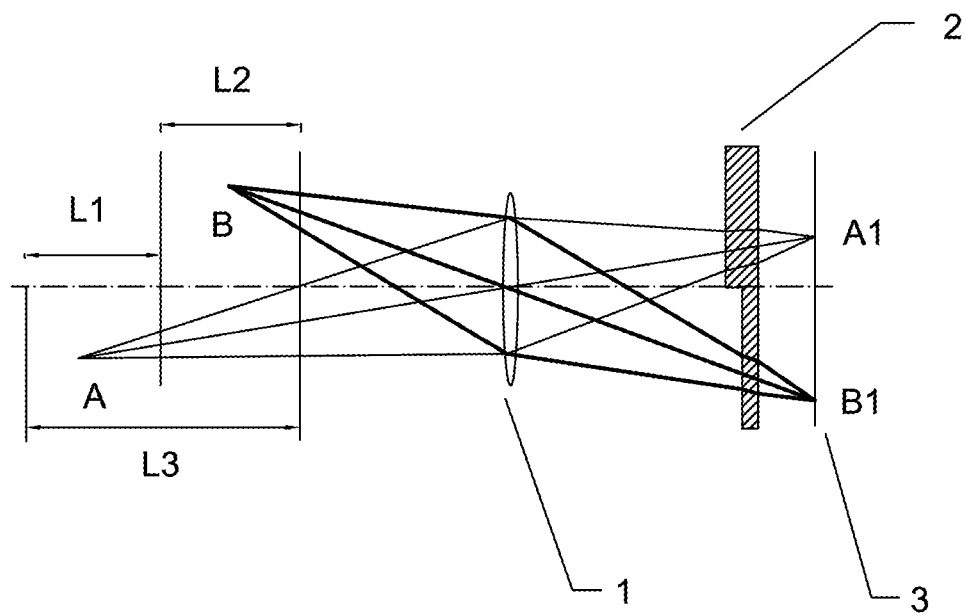
FIG. 2 is a schematic view of a lens according to a first embodiment of the present application.

FIG. 2 is a schematic view of a lens according to a first embodiment of the present application. As shown in FIG. 2, the lens includes an optical lens 1, an optical filter 2 and a photosensitive chip 3.

The optical filter 2 includes a first filter portion and a second filter portion and is disposed between the optical lens 1 and the photosensitive chip 3; wherein, a first object point is imaged on the photosensitive chip 3 through the optical lens 1 and the first filter portion, and a second object point is imaged on the photosensitive chip 3 through the optical lens 1 and the second filter portion, the first filter portion having a thickness greater than that of the second filter portion.

In this embodiment, in order to increase the DOF (Depth of Field) of a camera, the optical filter 2 is configured to include a first filter portion and a second filter portion, the first filter portion having a thickness greater than that of the second filter portion. The incident plane of the first filter portion corresponds to the field of view of the distal region of DOF and the incident plane of the second filter portion corresponds to the field of view of the proximal region of DOF. In comparison with the case of not passing through the optical filter 2, the image point will be moved more backward when an object point is imaged through a thicker filter portion, and will be moved less backward when the object point is imaged through a thinner filter portion. The DOF of the camera is increased through this embodiment.

The distal region of DOF refers to a region in which object points having an object distance (perpendicular distance between an object point and a lens) larger than a predetermined distance are located, and the proximal region of DOF refers to a region in which object points having an object distance smaller than the predetermined distance are located, the predetermined distance being the nominal object distance.

It should be emphasized that, in this embodiment, the object distance of the first object point is larger than that of the second object point. Specifically, the first object point can be an object point within the field of view of the distal region of DOF and the second object point can be an object point within the field of view of the proximal region of DOF. Thus, in terms of comparing the first object point with the second object point, the first object point can be regarded as a distal object point, and the second object point can be regarded as a proximal object point.

In particular, assuming that the first object point is a distal object point A and the second object point is a proximal object point B, as shown in FIG. 2, the imaging optical path of the distal object point A goes through an end of the optical filter 2 that has a larger thickness (the first filter portion) and the imaging optical path of the proximal object point B goes through an end of the optical filter 2 that has a smaller thickness (the second filter portion). The imaging beam of the proximal object point B is represented by thick solid lines and the imaging beam of the distal object point A is represented by thin solid lines. The image point corresponding to the proximal object point B is located at B1, and the image point corresponding to the distal object point A is located at A1. A1 and B1 are on the photosensitive chip 3, i.e., on the same image plane. With the optical filter 2 having filter portions of different thicknesses, object points, whether they have a larger object distance or a smaller object distance, can be imaged clearly on the image plane (the photosensitive chip 3), and the total DOF L3 (the sum of the proximal DOF L1 and the distal DOF L2) is greatly increased.

Figure 3:
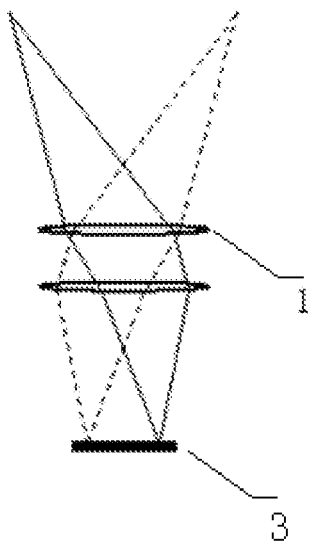
FIG. 3 is an optical path diagram illustrating the back focal length of the lens being increased by an optical filter according to the first embodiment of the present application.

FIG. 3 is an optical path diagram illustrating the back focal length of a camera being lengthened by an optical filter according to the first embodiment of the present application. As shown in FIG. 3, light is focused by the optical filter 2 (the first filter portion or the second filter portion), wherein dashed lines represent the imaging optical path without the optical filter 2 disposed in the lens, and solid lines represent the imaging optical path with the optical filter 2 disposed in the lens. Δ represents a displacement of the focal point between the two cases, and d represents the thickness of the optical filter 2.

Assuming that the object distance is u, the image distance is v, and the focal length of the lens is f, the Gauss imaging formula is:

$$\frac{1}{f} = \frac{1}{u} + \frac{1}{v} \tag{1}$$

The image distance v corresponding to any object distance u can be calculated according to the formula (1). It can be seen from formula (1) that v decreases as u increases, i.e., the object and the image move in the same direction. A longer object distance corresponds to a shorter image distance, in which case a thicker optical filter 2 is required to accordingly increase the image distance.

Assuming that the material of the optical filter 2 has a refractive index of n and a thickness of d, according to the refraction theorem in geometrical optics, the corresponding backward displacement of the convergence point after the imaging converging beam with perpendicular incidence passes through the optical filter 2 is:

$$\Delta = (n-1)*d \tag{2}$$

Thus, in a case of different object distances, the variation of the image distance and the thickness of the optical filter 2 configured to compensate for the image distance can be calculated according to formulas (1) and (2).

It should be noted that, the reason that the back focal length is lengthened by the optical filer 2 in this embodiment is that the refractive index (i.e., n) of the optical filter 2 is different from that of the air. The optical filter 2 disposed in the lens according to the embodiment of the present application can be a totally transparent optical filter, or an optical filter that selectively allows light with a specific wave length to pass through.

Assuming that the optical filter 2 has only two filter portions of different thicknesses, the DOF of the lens after adding the optical filter 2 can be calculated based on the thickness difference between the first filter portion and the second filter portion of the optical filter 2 and the original DOF of the lens. For example, for a 16 mm lens fitted with a "3 MP 1/1.8" industrial camera, if the lens aperture is set to 4.0 and the lens focuses on an object at a distance of 2 meters, the actual DOF is then approximately within the range of 1.62 to 2.6 meters. When using the optical filter 2 having two filter portions, assuming that the refractive index of the optical filter 2 is 1.5, the thickness difference between the first filter portion and the second filter portion is 0.2 mm, and the focus of the lens is adjusted so that an object at a distance of 2 meters still has the clearest image on the image area corresponding to the first filter portion, then the DOF corresponding to the first filter portion is also approximately within the range of 1.62 to 2.6 meters; while an object at a distance of 1.37 meters has the clearest image on the image area corresponding to the second filter portion, and the DOF is approximately within the range of 1.18 to 1.62 meters. Therefore, for an lens having an DOF within the range of 1.62 to 2.6 meters originally, the total DOF can be increased to the range of 1.18 to 2.6 meters with the use of the optical filter 2.

The lens according to this embodiment solves the technical problem of a lens in relevant art having a relatively small DOF, and increases the DOF of a camera by disposing the optical filter 2 between the optical lens 1 and the photosensitive chip 3, so that objects corresponding to different object distances can be imaged clearly respectively on different areas of the surface of the photosensitive chip 3. The lens according to this embodiment includes the optical lens 1 and the photosensitive chip 3, and further comprises the optical filter 2 having a first filter portion and a second filter portion and disposed between the optical lens 1 and the photosensitive chip 3, wherein, a first object point (i.e., a distal object point) is imaged on the photosensitive chip 3 through the optical lens 1 and the first filter portion, and a second point (i.e., a proximal object point) is imaged on the photosensitive chip 3 through the optical lens 1 and the second filter portion, wherein the first filter portion has a thickness larger than that of the second filter portion.

Preferably, the first filter portion and the second filter portion form a step-shaped structure. The step-shaped structure can include two or more filter portions, and object points with different object distances can be imaged on different areas of the photosensitive chip 3 through filter portions with different thickness respectively. The number and thickness of the filter portions of the step-shaped optical filter can be determined according to the specific scene to be shot. The focal position of the lens can be adjusted with the variation of the thickness of the step-shaped optical filter, so that objects corresponding to different object distances can be imaged clearly on different areas of the surface of the photosensitive chip 3 respectively.

Figure 5:
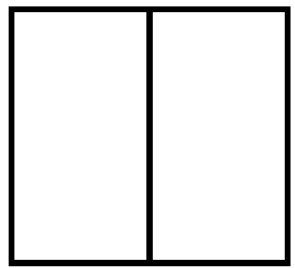
FIG. 5(a) is a cross section view of a two-step-shaped optical filter and a corresponding top view.
FIG. 5(b) is a cross section view of a three-step-shaped optical filter and a corresponding top view.
FIG. 5(c) is a cross section view of a four-step-shaped optical filter and a corresponding top view.
Figure 5:
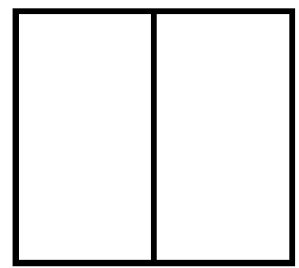
Figure 5:
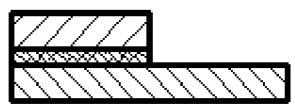
Figure 5:
Figure 5:
Figure 5:
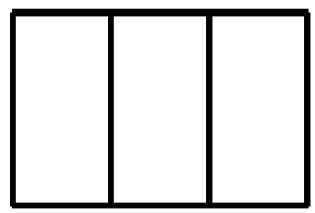
Figure 5:
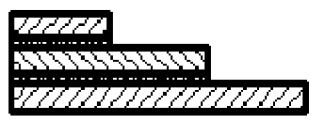
Figure 5:
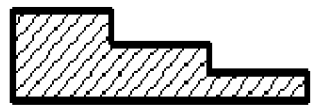
Figure 5:
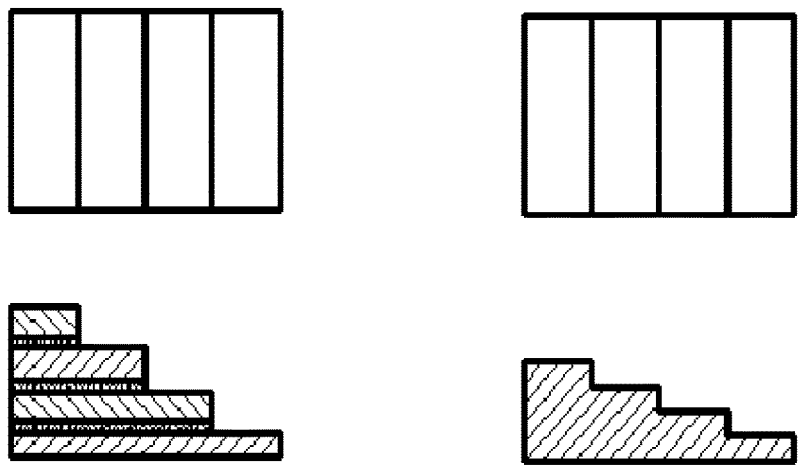

It should be noted that, the number of filter portions contained in the optical filter 2 is not limited to two as shown in FIG. 2. The number of filter portions 2 can be more than two. The more than two filter portions can also form a step-shaped structure. For example, the number of filter portions can be three as shown in FIG. 5(b), or four as shown in FIG. 5(c), which are both possible. Thus, the focal position of the lens can be adjusted with the variation of the thickness of the step-shaped optical filter, so that objects corresponding to different object distances can be imaged clearly on different areas of the surface of the photosensitive chip 3 respectively.

Preferably, the area ratio between the incidence plane of the first filter portion and that of the second filter portion is the ratio between the field of view of the distal region of DOF and that of the proximal region of DOF. The distal region of DOF is a region in which object points having an object distance (perpendicular distance between the object point and the lens) larger than a predetermined distance are located, and the proximal region of DOF is a region in which object points having an object distance smaller than the predetermined distance are located. For example, if the field of view of the distal region of DOF to be detected is the same as that of the proximal region of DOF to be detected, the area ratio between the incidence plane of the first filter portion and that of the second filter portion is 1:1; or, if the ratio between the field of view of the distal region of DOF to be detected and that of the proximal region of DOF to be detected is 2:1, the area ratio between the incidence plane of the first filter portion and that of the second filter portion is 2:1.

Figure 4:
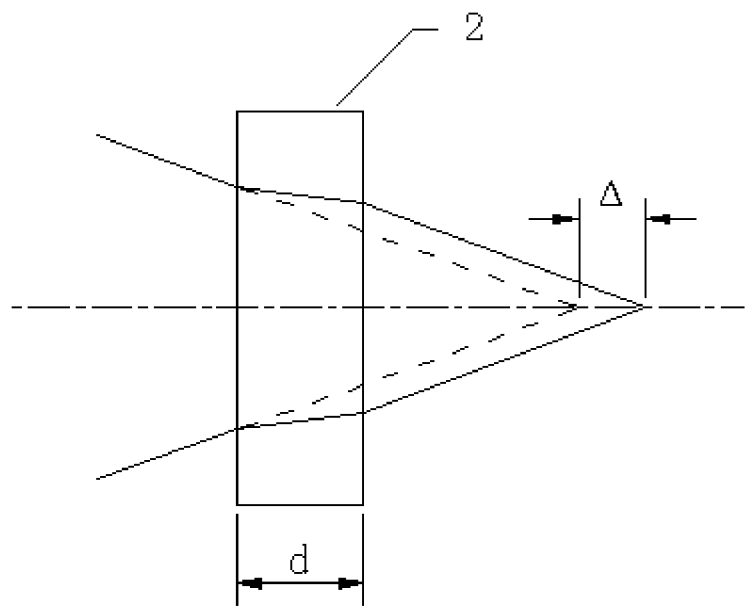
FIG. 4(a) is a schematic view of imaging in a conventional optical system.
FIG. 4(b) is an optical path diagram of a defocused point at a distant object distance in the optical system.
FIG. 4(c) is a schematic view of imaging in an optical system with a step-shaped optical filter.
Figure 4:
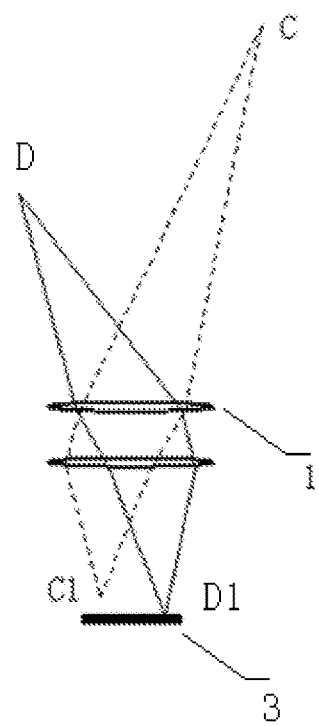
Figure 4:
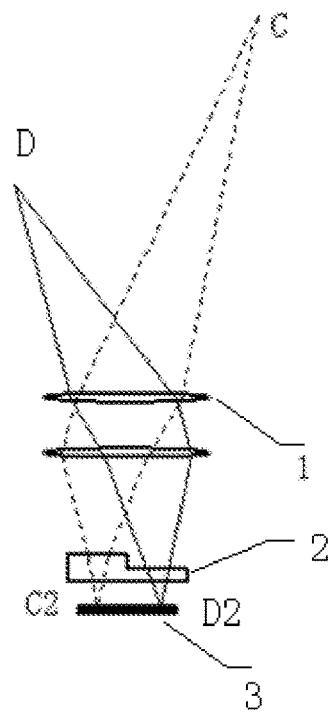

FIG. 4(a) is an imaging schematic diagram of a conventional optical system. FIG. 4(b) is an optical path diagram of a defocused distal object point in the optical system. FIG. 4(c) is an imaging schematic diagram of an optical system with a step-shaped optical filter. As shown in FIG. 4(a), solid lines and dashed lines therein represent, respectively, the imaging beams between the object and the image in the left and right fields of view. The object distances on both sides are the same, so the image distances are also the same (wherein, 1 is the optical lens, and 3 is the photosensitive chip). As shown in FIG. 4(b), the object point D on the left of the object of the optical system forms an image point D1 on the photosensitive chip 3. The object point C on the right of the object of the optical system is at a defocused location, as shown by the dashed lines in the diagram. Based on the imaging optical theorem, as the object distance increases, the image distance decreases accordingly, i.e., the imaging beam converges before reaching the surface of the photosensitive chip 3 (the image point is C1), while the imaging beam on the surface of the photosensitive chip 3 corresponding to the object point C has diverged into a round spot, which is not a clear image. As shown in FIG. 4(c), the object point D on the left of the object of the optical system forms an image point D2 on the photosensitive chip 3. As a step-shaped optical filter is configured in the optical system, although the object point C on the right of the object of the optical system is at a defocused location, for the corresponding image, the light passes through the thicker end of the optical filter 2, and its converging point (the image) will be moved backward accordingly and form an image point C2 on the photosensitive chip, wherein, the thicker the optical filter 2 is, the farther the converging point of the light is moved backward. Originally, the object distances of the objects in the left and right fields of view are different, and the image distances are different accordingly. However, the back focal distances of both sides can become the same by increasing the back focal length through adding, on the image side, the optical filter 2 with different thicknesses corresponding to the left and right fields of view, so that objects in the left and right fields of view, even if they are located at different object distances, can be simultaneously imaged clearly on the same image plane.

Optionally, the optical filter 2 includes a transparent step-shaped optical filter.

In the above embodiment, the optical filter 2 can be formed by several flat optical filters bonded together or by cutting and grinding the same one piece of transparent optical material into a step shape. The specific process of forming the step-shaped optical filter is not limited in the present application.

FIG. 5(a) is a cross section view of a two-step-shaped optical filter and a corresponding top view. FIG. 5(b) is a cross section view of a three-step-shaped optical filter and a corresponding top view. FIG. 5(c) is a cross section view of a four-step-shaped optical filter and a corresponding top view. The two-step-shaped optical filter includes two filter portions, the three-step-shaped optical filter includes three filter portions, and the four-step-shaped optical filter includes four filter portions. In FIG. 5(a), the optical filter can be fabricated from two layers of flat glass (or other flat transparent optical materials) glued in between by an optical adhesive (as shown in two left drawings in FIG. 5(a), the top left one is a top view of the optical filter, and the bottom left one is the corresponding cross section view). The size ratio between the thicker portion and the thinner portion of the optical filter can be determined according to actual application scenes. For example, if the field of view of the distal region of DOF to be detected is the same as that of the proximal region of DOF, the ratio between the thicker portion and the thinner portion can be set to 1:1. The optical filter can also be formed into a step shape by cutting and grinding the same one piece of transparent optical material (as shown in two right drawings in FIG. 5(a), the top right one is a top view of the optical filter, and the bottom right one is the corresponding cross section view).

FIG. 5(b) and FIG. 5(c) are similar to FIG. 5(a), and therefore are not described here. It should be noted that, the two drawings on the left side of FIG. 5(b) (or FIG. 5(c)) are a top view and a cross section view of an optical filter made from a flat transparent optical material, and the two drawings on the right side are a top view and a cross section view of an optical filter made by cutting and grinding the same one piece of transparent optical material into a step shape, wherein, the up drawings are the top views, and the bottom drawings are the cross section views. The DOF of a camera can be further increased if the optical filter is configured to have a multi-step-shaped (at least 3 step-shaped) structure. The photosensitive area of a camera that is monitoring a specific DOF will, however, be reduced accordingly. In addition, more than four filter portions can be contained, and the present application is not limited in this regard.

Figure 6:
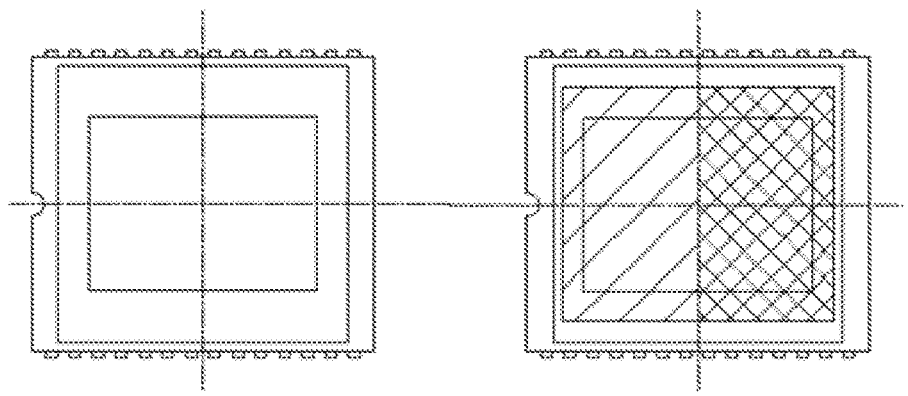
FIG. 6(a) is a schematic view of the relative position between the optical filter and the photosensitive chip when the boundary between the thicker and thinner portions of the optical filter according to the first embodiment of the present application is in a vertical direction.
FIG. 6(b) is a schematic view of the relative position between the optical filter and the photosensitive chip when the boundary between the thicker and thinner portions of the optical filter according to the first embodiment of the present application is in a horizontal direction.
Figure 6:
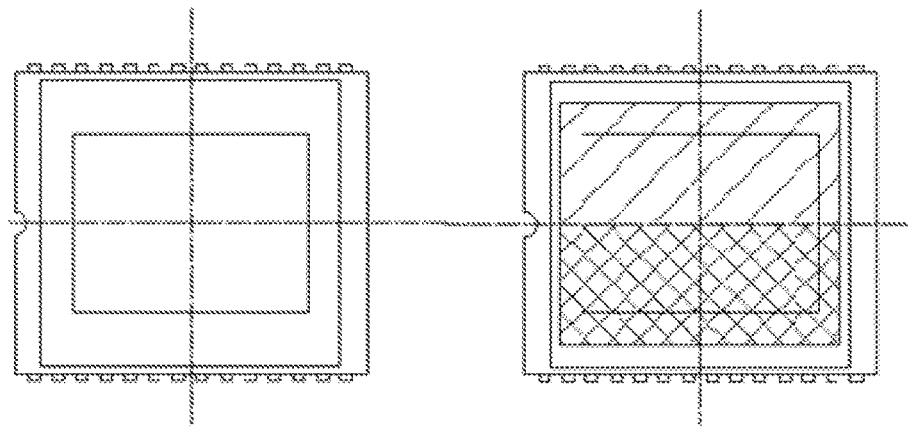

FIG. 6(a) is a schematic view of a relative position between the optical filter and the photosensitive chip when the boundary between the thicker and thinner portions of the optical filter according to the first embodiment of the present application is in a vertical direction. FIG. 6(b) is a schematic view of a relative position between the optical filter and the photosensitive chip when the boundary between the thicker and thinner portions of the optical filter according to the first embodiment of the present application is in a horizontal direction. In FIG. 6(a), the left drawing illustrates a photosensitive chip without an optical filter, and the right drawing illustrates a photosensitive chip with an optical filter. The hatched area indicates the thinner portion of the optical filter and the gridded area indicates the thicker portion. FIG. 6(b) is similar to FIG. 6(a), and therefore is not described here.

Optionally, the surface of the photosensitive chip 3 is provided with protection glass, and the optical filter is glued to the surface of the protection glass. Or, optionally, the optical filter is fixed on a printed circuit board through a holder.

Figure 7:
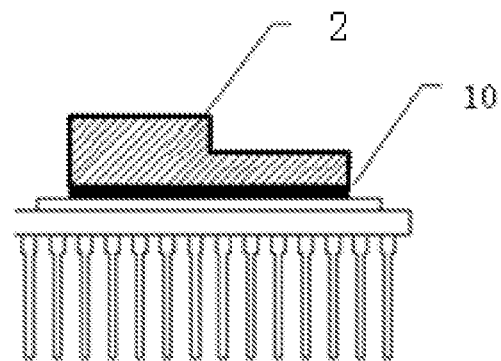
FIG. 7(a) is a schematic view of an installation structure of the optical filter installed by gluing according to the first embodiment of the present application.
FIG. 7(b) is a schematic view of an installation structure of the optical filter installed through a holder according to the first embodiment of the present application.
Figure 7:
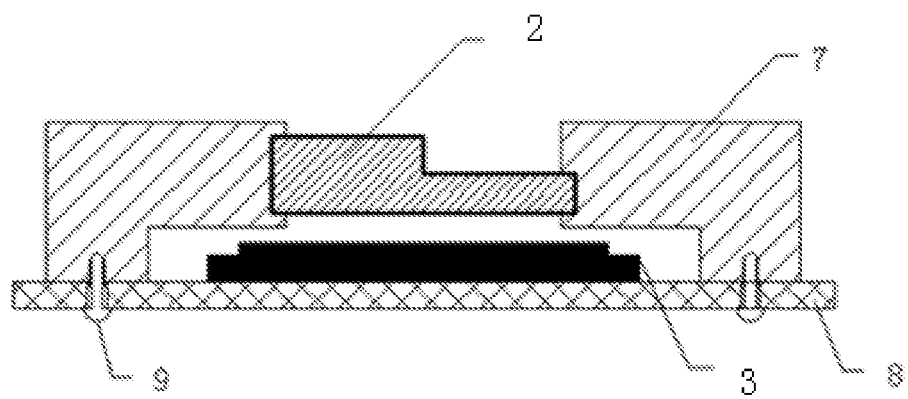

FIG. 7(a) is a schematic view of an installation structure of the optical filter 2 installed by gluing according to the first embodiment of the present application. FIG. 7(b) is a schematic view of an installation structure of the optical filter 2 installed through a holder according to the first embodiment of the present application. In FIG. 7(a), the optical filter 2 is fixed on the surface of the photosensitive chip by gluing. As the surface of the photosensitive chip typically has a layer of protection glass, the step-shaped optical filter 2 can be glued directly on the surface of the protection glass with an optical adhesive 10. It requires particular attention to keep the glue from overflowing when gluing. Otherwise, the image can be affected greatly. In FIG. 7(b), the optical filter 2 is clamped through a holder 7 fixed to a printed circuit board (PCB) 8 through screws 9. The photosensitive chip 3 is glued to the printed circuit board 8.

Preferably, the optical filter 2 is connected with a control component via a transmission component to be controlled and moved to a target position. At this target position, the imaging optical path of the first object point goes through the first filter portion, and the imaging optical path of the second object point goes through the second filter portion.

Figure 8:
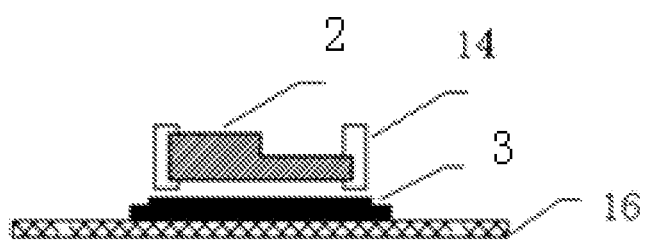
FIG. 8(a) is a cross section view of a lens having a step-shaped optical filter according to the first embodiment of the present application.
FIG. 8(b) is a top view of a driving system of a lens having a step-shaped optical filter according to the first embodiment of the present application.
Figure 8:
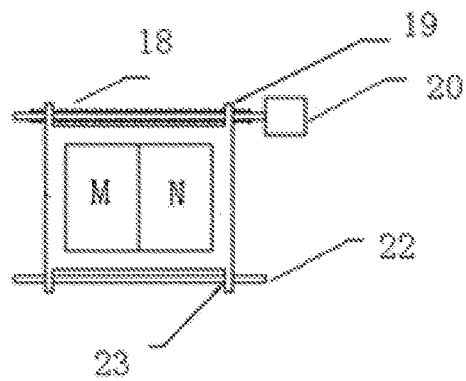

FIG. 8(a) is a cross section view of a lens having a step-shaped optical filter 2 according to the first embodiment of the present application. FIG. 8(b) is a top view of a driving system of a lens having a step-shaped optical filter 2 according to the first embodiment of the present application. As shown in FIG. 8(a), in the cross section view of the lens having the step-shaped optical filter 2 (a motor 20, rail 22 and screw rod 18 are not shown), the step-shaped optical filter 2 is fixed to a carrier component 14, and the photosensitive chip 3 is glued onto a PCB 16. As shown in FIG. 8(b), in the top view of the driving system (the photosensitive chip 3 and PCB 16 are not shown), the thinner portion and the thicker portion of the step-shaped optical filter correspond to the areas M and N respectively, that is, the thinner portion of the step-shaped optical filter corresponds to the area M and the thicker portion of the step-shaped optical filter corresponds to the area N. The step-shaped optical filter 2 is connected with the screw rod 18 through the carrier component 14. The screw rod 18 is provided with a screw pair (jaw) 19 and connected to the motor 20, through which the screw rod 18 can be driven to move along the sliding rail 22 (through a sliding hole 23) to drive the carrier component 14 to move, so that the step-shaped optical filter 2 can be moved to a target position.

Preferably, the incidence plane and the exit plane of the optical filter 2 are coated with an optical anti-reflection film and/or infrared cut-off film. The optical anti-reflection film (pro-transmittance film) can reduce the reflection of incident light, improving the optical imaging quality of a camera.

Figure 9:
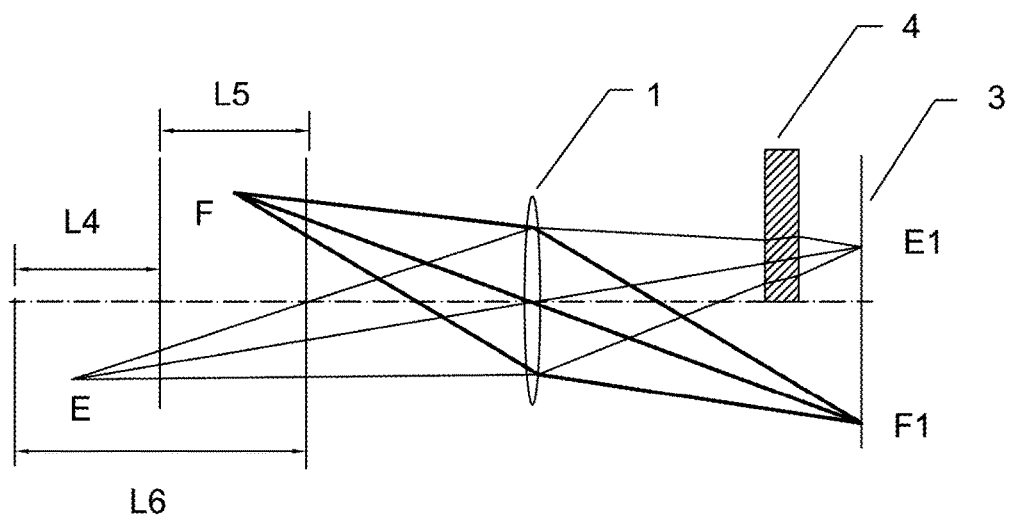
FIG. 9 is a schematic view of a lens according to a second embodiment of the present application.

FIG. 9 is a schematic view of a lens according to a second embodiment of the present application. As shown in FIG. 9, the lens includes an optical lens 1, a photosensitive chip 3 and an optical filter 4.

In this embodiment, the optical filter 4 is disposed between the optical lens 1 and the photosensitive chip 3, wherein, a first object point is imaged on the photosensitive chip 3 through the optical lens 1 and the optical filter 4, and a second object point is imaged on the photosensitive chip 3 through the optical lens 1.

In the second embodiment of the present application, in a manner similar to the first embodiment, the object distance of the first object point is larger than that of the second object point. In other words, in terms of comparing the first object point with the second object point, the former can be regarded as a distal object point, and the latter can be regarded as a proximal object point.

In particular, the optical filter 4 has a uniform thickness and is disposed between the optical lens 1 and the photosensitive chip 3, wherein, the location at which the first object point (E) is imaged on the photosensitive chip 3 through the optical lens 1 and the optical filter 4 is a first image point (E1), and the location at which the second object point (F) is imaged on the photosensitive chip 3 through the optical lens 1 is a second image point (F1), and the object distance of the first object point is larger than that of the second object point. E1 and F1 are both on the photosensitive chip 3, i.e., object points with different object distances are imaged on a same one image plane. In general, when an image point is on the photosensitive chip 3 or within a certain distance (small enough) from the photosensitive chip 3, it can be considered as being imaged clearly. In this embodiment, as the optical filter 4 is disposed between the optical lens 1 and the photosensitive chip 3, the imaging location of the first object point having a larger object distance is moved backward relative to the optical lens, so that the first object point is imaged on the photosensitive chip 3.

This embodiment increases the original DOF of the camera. Specifically, assuming an optical path that goes through the first object point E, the optical lens 1, and the optical filter 4 and converges at the first image point E1 is a first optical path with a DOF referred to as a first DOF (L4), and an optical path that goes through the second object point F and the optical lens 1, and converges at the second image point F1 is a second optical path with a DOF referred to as a second DOF (L5). As shown in FIG. 9, the near object distance of the first optical path is equal to the far object distance of the second optical path, which is equivalent to stitching the DOF of the first optical path and the DOF of the second optical path together (the total DOF L6=L4+L5), increasing the DOF of the camera. Or, in some cases, the near object distance of the first optical path is smaller than the far object distance of the second optical path and their DOFs partially overlap, but the total DOF is still larger than the individual DOF of the first optical path or of the second optical path (the total DOF L6 is larger than either of L4 and L5). Thus, an increase of the DOF of the camera is also achieved in this situation.

The lens provided by this embodiment solves the technical problem of a lens of a camera in relevant art having a relatively small DOF, and increases the DOF of the lens by disposing the optical filter 4 with a uniform thickness between the optical lens 1 and the photosensitive chip 3, so that objects corresponding to different object distances can be imaged on different areas on the surface of the photosensitive chip 3. The lens provided in this embodiment includes an optical lens 1 and a photosensitive chip 3, and further includes an optical filter 4 disposed between the optical lens 1 and the photosensitive chip 3, wherein a first object point (i.e., a distal object point) is imaged on the photosensitive chip 3 through the optical lens 1 and the optical filter 4, and a second object point (i.e., a proximal object point) is imaged on the photosensitive chip 3 through the optical lens 1. In this embodiment, since the optical filter 4 has a uniform thickness, it is easier to be obtained and simpler to be operated.

Preferably, the central axis of the optical filter 4 is parallel to the optical axis of the optical lens, and spaced from the optical axis by a predetermined distance.

In this embodiment, in order to make the imaging optical path of the first object point go through the optical filter 4 and the imaging optical path of the second object point not go through the optical filter 4, the central axis of the optical filter 4 needs to be adjusted to be parallel to the optical axis of the optical lens and spaced from the optical axis by a predetermined distance. At this predetermined distance, imaging optical paths of as many object points as possible with a far object distance go through the optical filter 4. For different scenes to be shot, the value of the predetermined distance can be adjusted according to the ratio between the far-object-distance field of view and the near-object-distance field of view, so that the ratio between the area of the optical paths that go through the optical filter 4 and the area of the optical paths that do not go through the optical filter 4 is close to the ratio between the far-object-distance field of view (corresponding to the field of view of the distal region of DOF in the first embodiment of the present application) and the near-object-distance field of view (corresponding to the field of view of the proximal region of DOF in the first embodiment of the first present application).

Preferably, the optical filter 4 is connected to a control component via a transmission component in order to be controlled and moved to a target position. At the target position, the imaging optical path of the first object point goes through the optical filter 4 and the imaging optical path of the second object point does not go through the optical filter 4.

Figure 10:
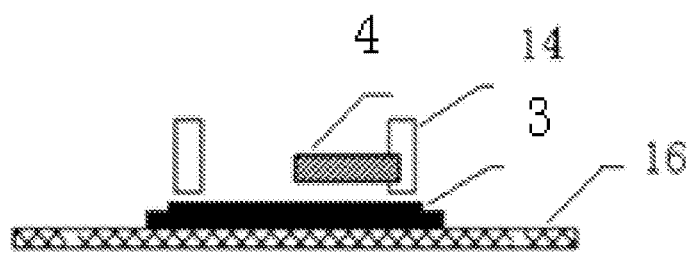
FIG. 10(a) is a cross section view of a lens with an optical filter having a uniform thickness according to the second embodiment of the present application.
FIG. 10(b) is a top view of a driving system of a lens with an optical filter having a uniform thickness according to a second embodiment of the present application.
Figure 10:
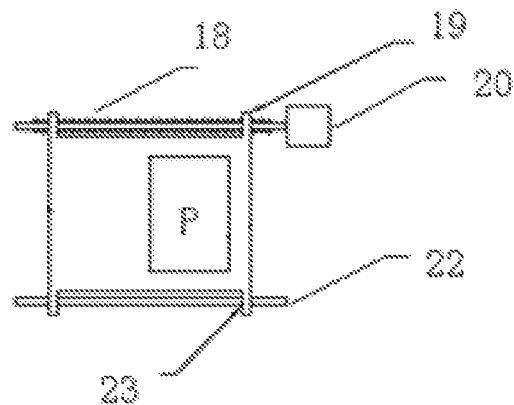

FIG. 10(*a*) is a cross section view of a lens with an optical filter 4 having a uniform thickness according to the second embodiment of the present application. FIG. 10(*b*) is a top view of a driving system of a lens with the optical filter having a uniform thickness according to the second embodiment of the present application. As shown in FIG. 10(*a*), in the cross section view of the lens with the optical filter 4 having a uniform thickness (a motor 20, rail 22 and screw rod 18 are not shown), the optical filter 4 having a uniform thickness is fixed to a carrier component 14, and the photosensitive chip 3 is glued to a PCB 16. As shown in FIG. 10(*b*), in the top view of the driving system (the photosensitive chip 3 and the PCB 16 are not shown), the optical filter having a uniform thickness corresponds to an area P (areas on the carrier other than P correspond to air). The optical filter 4 having a uniform thickness is connected with the screw rod 18 through the carrier component 14. The screw rod 18 is provided with a screw pair (jaw) 19 and connected to the motor 20, through which, the screw rod 18 can be driven to move along the sliding rail 22 (through a sliding hole 23) to drive the carrier component 14 to move, so that the optical filter 4 having a uniform thickness can be moved to a target position.

A camera is also provided below according to an embodiment of the present application. The camera includes any one of the lenses provided in embodiments of the present application.

Preferably, the camera further includes: an integrated circuit chip connected with the photosensitive chip and configured to process signals produced on the photosensitive chip to obtain a first processing result; at least one voltage signal conversion circuit connected with the integrated circuit chip and configured to convert voltage signals input to or output from the integrated circuit chip; and a color encoding circuit connected with the integrated circuit chip and configured to perform a color encoding for the first processing result to obtain a second processing result.

Figure 11:
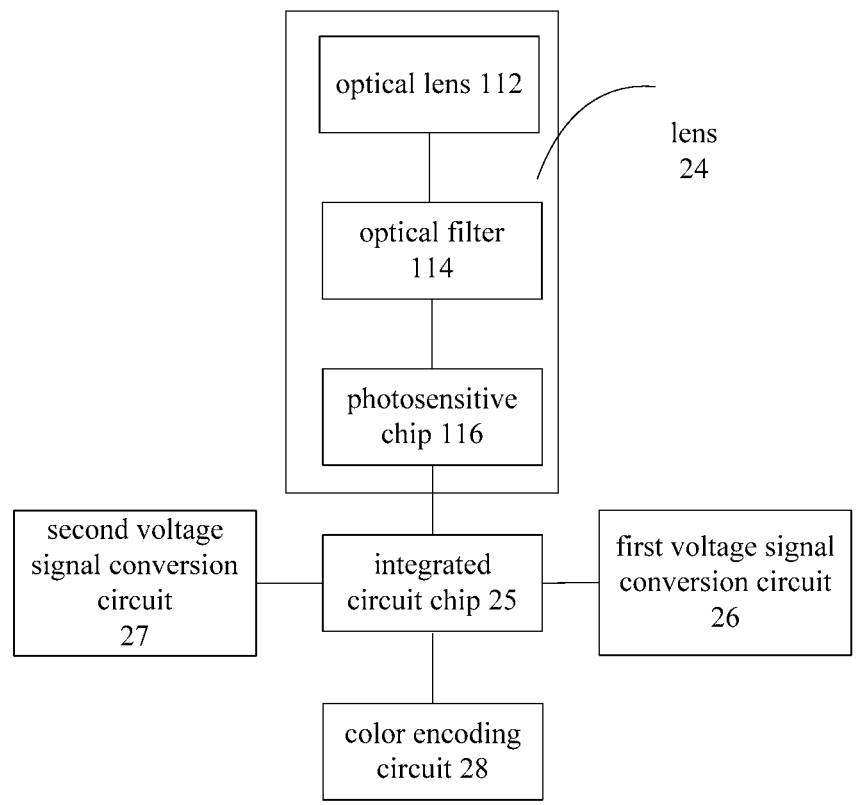
FIG. 11 is an schematic view of a camera according to an embodiment of the present application.

FIG. 11 is an schematic view of a camera according to the embodiment of the present application. As shown in FIG. 11, the camera includes: a lens 24, an integrated circuit chip 25, a first voltage signal conversion circuit 26, a second voltage signal conversion circuit 27 and a color encoding circuit 28, wherein, the lens 24 includes an optical lens 112, an optical filter 114, and a photosensitive chip 116. In this embodiment, the optical filter 114 can be a step-shaped optical filter or an optical filter having a uniform thickness. Specifically, the integrated circuit chip 25 is connected with the photosensitive chip 116 and configured to process electrical signals produced on the photosensitive chip to obtain a first processing result; the first voltage signal conversion circuit 26 is connected with the integrated circuit chip 25 and configured to convert voltage signals input to the integrated circuit chip 25; the second voltage signal conversion circuit 26 is connected with the integrated circuit chip 25 and configured to convert voltage signals output from the integrated circuit chip 25; and the color encoding circuit 28 is connected with the integrated circuit chip 25 and configured to perform a color encoding of the first processing result to obtain a second processing result.

In this embodiment, the photosensitive chip 116 converts received optical signals into electrical signals. The integrated circuit chip 25 processes the electrical signals produced on the photosensitive chip. The voltage signal conversion circuits can convert the voltage signals produced by the integrated circuit chip 25 in order to transmit the voltage signals to other processing modules, or can convert signals produced by other processing modules into electrical signals that can be received by the integrated circuit chip 25. The color encoding circuit 28 can perform an encoding (such as, RGB, YUV) for the processing result output by the integrated circuit chip 25.

The first voltage conversion circuit 26 or the second voltage conversion circuit 27 can be implemented by an I/O interface module, and the integrated circuit chip 25 can be implemented by a SOC (System on Chip) module.

In addition, a package inspection system is further provided according to an embodiment of the present application. The package inspection system includes any one of the cameras provided in the present application.

Preferably, the package inspection system includes: a camera including a lens, an integrated circuit chip, at least one voltage signal conversion circuit and a color encoding circuit; a laser trigger; a fill light and a post-processing circuit. In this package inspection system, the lens includes an optical lens, a photosensitive chip, and an optical filter having a first filter portion and a second filter portion and disposed between the optical lens and the photosensitive chip. A first object point is imaged on the photosensitive chip through the optical lens and the first filter portion, and a second object point is imaged on the photosensitive chip through the optical lens and the second filter portion, wherein the first filter portion having a thickness greater than that of the second filter portion. The integrated circuit chip is connected with the photosensitive chip and configured to process electrical signals produced on the photosensitive chip to obtain a first processing result. The at least one voltage conversion circuit is connected with the integrated circuit chip and configured to convert voltage signals input to or output from the integrated circuit chip. The color encoding circuit is connected with the integrated circuit chip and configured to perform a color encoding for the first processing result to obtain a second processing result. The at least one voltage signal conversion circuit includes a first voltage signal conversion circuit and a second voltage signal conversion circuit. The laser trigger is connected with the first voltage signal conversion circuit and configured to trigger the camera to shoot. The fill light is connected with the second voltage signal conversion circuit and configured to provide fill light for the camera. The post-processing circuit is connected with the color encoding circuit and configured to perform a predetermined processing for the second processing result.

Figure 12:
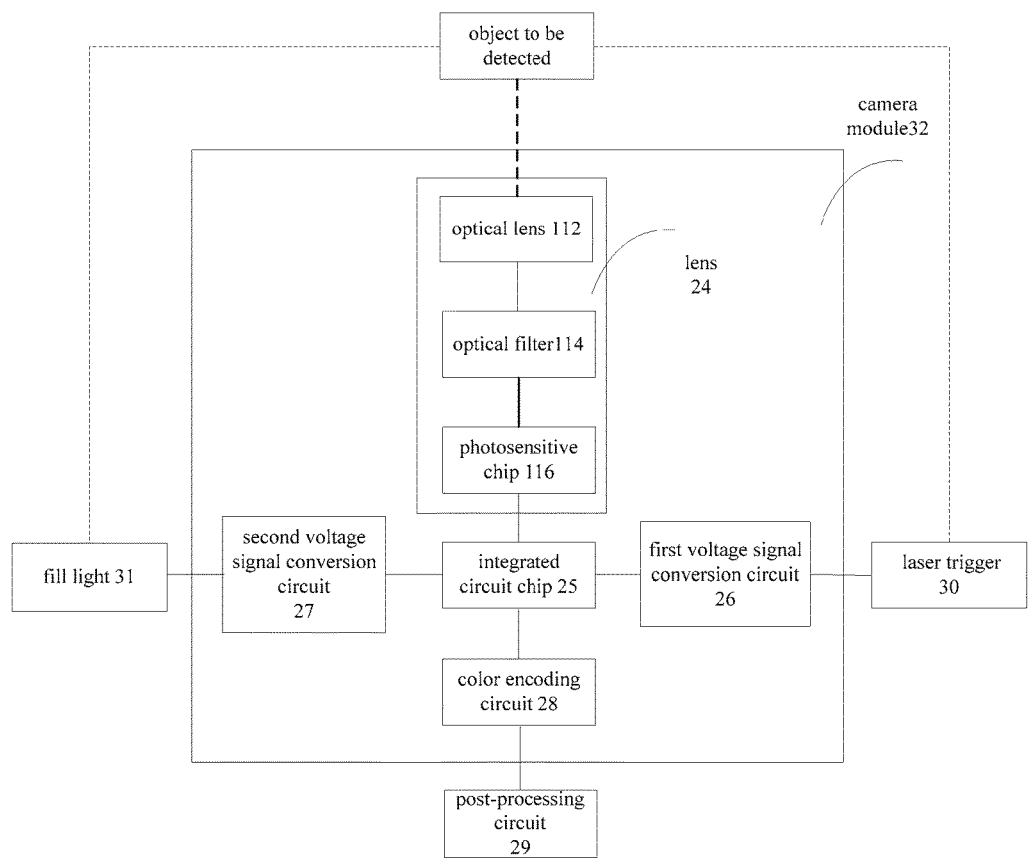
FIG. 12 is a schematic view of a package inspection system according to an embodiment of the present application.

FIG. 12 is a schematic view of a package inspection system according to the embodiment of the present application. As shown in FIG. 12, the package inspection system includes: a camera module 32, a post-processing circuit 29, a laser trigger 30, and a fill light 31; wherein, the camera module 32 includes a lens 24, an integrated circuit chip 25, a first voltage signal conversion circuit 26, a second voltage signal conversion circuit 27, and a color encoding circuit 28. The lens 24 includes an optical lens 112, an optical filter 114, and a photosensitive chip 116. In this embodiment, the optical filter 114 can be a step-shaped optical filter or an optical filter having a uniform thickness.

In particular, the color encoding circuit 28 of the camera module 32 is connected with the post-processing circuit 29, the laser trigger 30 is connected with the first voltage signal conversion circuit 26 of the camera module 32, and the fill light 31 is connected with the second voltage signal conversion circuit 27 of the camera module 32. An object to be detected is imaged on the photosensitive chip 116 through the optical lens 112 and optical filter 114. When the object to be detected goes through a detection area, the laser trigger 30 emits a trigger signal, the camera module 32 shoots a picture of the object to be detected upon receiving this trigger signal, and the color encoding circuit 28 encodes the picture shot and outputs the processing result to the post-processing circuit 29. The post-processing circuit 29 can perform defect detection, color determination, size measurement, three-dimension imaging, barcode identification, counting, and so forth (i.e., performing predetermined processing) according to actual detection requirements. The fill light 31 receives, through the second voltage signal conversion circuit 27, control information generated by the integrated circuit chip 25 to achieve the synchronization between lighting and shooting, or to control its lighting intensity, color, switching and area lighting, and can satisfy various lighting requirements.

An image processing method is further provided below according to an embodiment of the present application.

Figure 13:
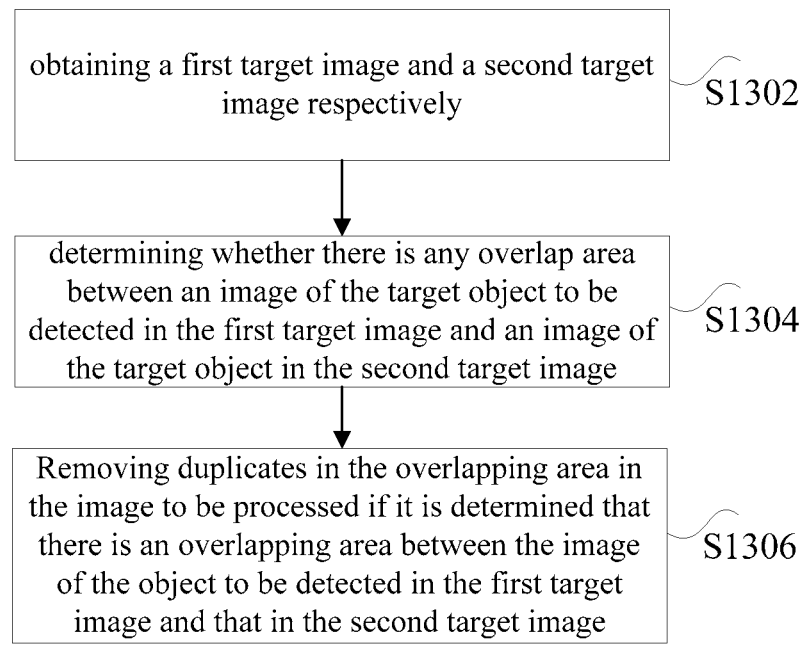
FIG. 13 is a flow chart of an image processing method according to the first embodiment of the present application.

FIG. 13 is a flow chart of an image processing method according to the first embodiment of the present application. As shown in FIG. 13, the method includes the following steps:

Step S1302, obtaining a first target image and a second target image respectively, wherein the first target image is a part of an image to be processed that is formed on a photosensitive chip through an optical lens and a first filter portion, and the second target image is a part of the image to be processed that is formed on the photosensitive chip through the optical lens and a second filter portion. The image to be processed is an image of a target object to be detected shot with a lens. The lens includes an optical lens, a photosensitive chip and an optical filter disposed between the optical lens and the photosensitive chip and including a first filter portion and a second filter portion, wherein the first filter portion has a thickness greater than that of the second filter portion.

When the objects to be detected are imaged on the photosensitive chip through the optical filter, the preferable images in the present application are an image formed on the photosensitive chip at a distal end through the first filter portion and an image formed on the photosensitive chip at a proximal end through the second filter portion. But in an actual imaging process, an object point at a distal end may form a blurred image on the photosensitive chip through the second filter portion, and likewise, an object point at a proximal end may also form a blurred image on the photosensitive chip through the first filter portion. As a result, the image (the image to be processed) need to be further processed after being shot by the camera, in order to obtain an image formed on the photosensitive chip at a distal end through the first filter portion and an image formed on the photosensitive chip at a proximal end through the second filter portion. In this manner, the image obtained ultimately is the clearest image.

Step S1304, determining whether there is any overlapping area between an image of the target object to be detected in the first target image and an image of the target object to be detected in the second target image.

In this step, the first target image is a part of an image to be processed that is formed on the photosensitive chip through the optical lens and the first filter portion, and the second target image is a part of the image to be processed that is formed on the photosensitive chip through the optical lens and the second filter portion. Through the analysis in step S1302, any overlapping area that may exist between the first object image and the second object image can be found. For example, a first end (the distal end) of the object to be detected is imaged clearly on the photosensitive chip through the optical lens and the first optical filter, and also form simultaneously a blurred image (which is to be eliminated during subsequent process) on the photosensitive chip through the optical lens and the second optical filter.

Step S1306, performing de-duplication to the overlapping area in the image to be processed if it is determined that there is an overlapping area between an image of the target object to be detected in the first target image and an image of the target object to be detected in the second target image.

In this step, if it is determined that there is an overlapping area between an image of the target object to be detected in the first target image and an image of the target object to be detected in the second target image, for example, if image 1 and image 2 are both images of the first end of the object to be detected (wherein, image 1 is relatively blurred) and overlap with each other, resulting in reduction of the definition of the image to be processed. Then according to the embodiment of the present application, image 1 should be removed and only image 2 in the image to be processed is retained.

It should be noted that whether there exists any overlapping area between an image of the target object to be detected in the first target image and an image of the target object to be detected in the second target image is related to factors such as the position of the lens with respect to the scene being shot, and the scene itself. The specific reasons for the existence of an overlapping area is not limited in the present application.

The image processing method according to this embodiment can ensured that different areas of the image ultimately obtained correspond to object points with different object distances by removing duplicates for images formed through filter portions with different thicknesses in the image to be processed. In other words, the image obtained includes image points on different areas of the photosensitive chip formed respectively by far-object-distance object points and near-object-distance object points. As the DOF of the lens is increased, the image obtained is clearer. The image processing method according to this embodiment includes: obtaining a first target image and a second target image, wherein the first target image is a part of an image to be processed that is formed on the photosensitive chip through the optical lens and the first filter portion, and the second target image is a part of the image to be processed that is formed on the photosensitive chip through the optical lens and the second filter portion, the image to be processed is an image of the object to be detected shot by the lens including an optical lens, a photosensitive chip and an optical filter disposed between the optical lens and the photosensitive chip and including the first filter portion and the second filter portion, wherein the first filter portion has a thickness greater than that of the second filter portion; determining whether there is any overlapping area between an image of the target object to be detected in the first target image and an image of the target object to be detected in the second target image; and performing de-duplication to the overlapping area in the image to be processed if it is determined that there is an overlapping area between an image of the target object to be detected in the first target image and an image of the target object to be detected in the second target image.

Preferably, in order to improve imaging quality, before obtaining the first target image and the second target image, the method further includes: obtaining a first proportion and a second proportion respectively, wherein the first proportion is a proportion of the image of the object to be detected in a first region of an image to be processed, and the second proportion is a proportion of the image of the object to be detected in a second region of the image to be processed; determining if the difference between the first proportion and the second proportion reaches a threshold, wherein the first proportion is larger than the second proportion; and adjusting the position of the optical filter to increase the second proportion and re-obtaining the image to be processed if it is determined that the difference between the first proportion and the second proportion reaches the threshold.

When an initial image of the object to be detected is obtained, the optical filter of the camera is disposed between the optical lens of the camera and the photosensitive chip of the camera. During the imaging of the object to be detected, an object point is imaged through the optical filter, so that the image point corresponding to this object point is moved backward relative to the optical lens of the camera, i.e., the back focal length of the camera is increased by the optical filter. If the distal end (the end that has a larger object distance) of the object to be detected is imaged through the optical filter when being shot, the image of the distal end of the object can be more clearer. However, as the optical filter is disposed between the optical lens and the photosensitive chip, it can also result in a problem that the camera is unable to recognize the entire object to be detected when its size is relatively large. In this embodiment, after obtaining the initial image, the position of the optical filter can be adjusted according to imaging conditions of the initial image to ensure that the entire object to be detected is imaged on the photosensitive chip. The image to be processed can be shot after the adjustment of the optical filter.

The initial image, after being obtained, is divided into different regions according to a predetermined rule. For example, the initial image can be equally divided into two regions (i.e., a first region and a second region), or otherwise, the initial image can be divided into multiple regions (including a first region and a second region). The proportion of the object to be detected in the first region (a first proportion) and the proportion of the object to be detected in the second region (a second proportion) are obtained respectively. Typically, the thicker end of the optical filter corresponds to the distal end of the object, and the thinner end of the optical filter corresponds to the proximal end of the object. Assuming that a relatively large area of the proximal end area is imaged through the thicker end of the optical filter, then it is very likely that the imaging area corresponding to the proximal end cannot be imaged fully (i.e., the imaging area corresponding to the proximal end cannot have an image of the entire proximal end).

The difference between the first proportion and the second proportion can represent the influence of the optical filter on the imaging of the object to be detected, that is, the difference between the first proportion and the second proportion can vary as the position of the optical filter changes. For example, when the proximal end of the object to be detected is imaged through the optical filter but the distal end of the object is imaged without passing through the optical filter, in which case, the initial image is divided into two regions corresponding to the distal end of the object and the proximal end of the object. The proportion of the object to be detected in the region corresponding to the distal end of the object is far smaller than the proportion of the object to be detected in the region corresponding to the proximal end of the object, making it impossible to have a full image. In this case, the position of the optical filter needs to be adjusted to increase the proportion of the object to be detected in the region corresponding to the distal end. The predetermined threshold can be determined empirically Optionally, in order to improve the ease of movement of the optical filter, the movement of the optical filter can be controlled by a motor. In other words, upon determining that the difference between the first proportion and the second proportion reaches a predetermined threshold, a motor control signal is generated and transmitted to the motor, so that the motor drives a transmission component to move, thus drives the optical filter into motion.

Preferably, the position of the optical filter can be originally disposed at a predetermined position where the central axis of the optical filter coincides with the optical axis of the optical lens. The optical filter can be moved according to the shooting result of the initial image.

Preferably, adjusting the position of the optical filter to increase the second proportion includes: determining a target movement amount according to the first proportion, the second proportion, the area of the first region, and the area of the second region (or the first proportion, the second proportion, the area of the image of the object to be detected in the first region, and the area of the image of the object to be detected in the second region); moving the optical filter towards a target direction by the target movement amount, wherein the target direction is the direction from the first region to the second region.

Assuming that the area of the first region is a1, the area of the second region is a2, and the first proportion and the second proportion are k1 and k2 respectively; the area of the image of the object to be detected in the first region is u1, and the area of the image of the object to be detected in the second region is u2, the target movement amount x can be determined by the following formula:

$$u1=k1*a1,$$

$$u2=k2*a2,$$

assuming that k1>k2+d (wherein d is the predetermined threshold), and the target movement amount is x, the following equation can be obtained:

$$\frac{k1*a1}{a1+x} = \frac{k2*a2}{a2-x}$$

The target movement amount x can be calculated according to the above formula.

Or, the optical filter can also be moved through manual adjustment. For example, the movement of the optical filter can be implemented by employing a screw rod. The optical filter is disposed on a carrier component that is connected with an adjustment component through the screw rod. The adjustment component can be manually rotated by the user, for example, the optical filer can be moved in a predetermined direction for a predetermined distance per one round of rotation. When it is determined that the difference between the first proportion and the second proportion of the initial image reaches the predetermined threshold, the adjustment component can be rotated by the user. After each rotation, it is determined again if the threshold is reached, and if the predetermined threshold is still reached, the adjustment component can be rotated again till the difference between the first proportion and the second proportion of the obtained image falls below the predetermined threshold.

Figure 14:
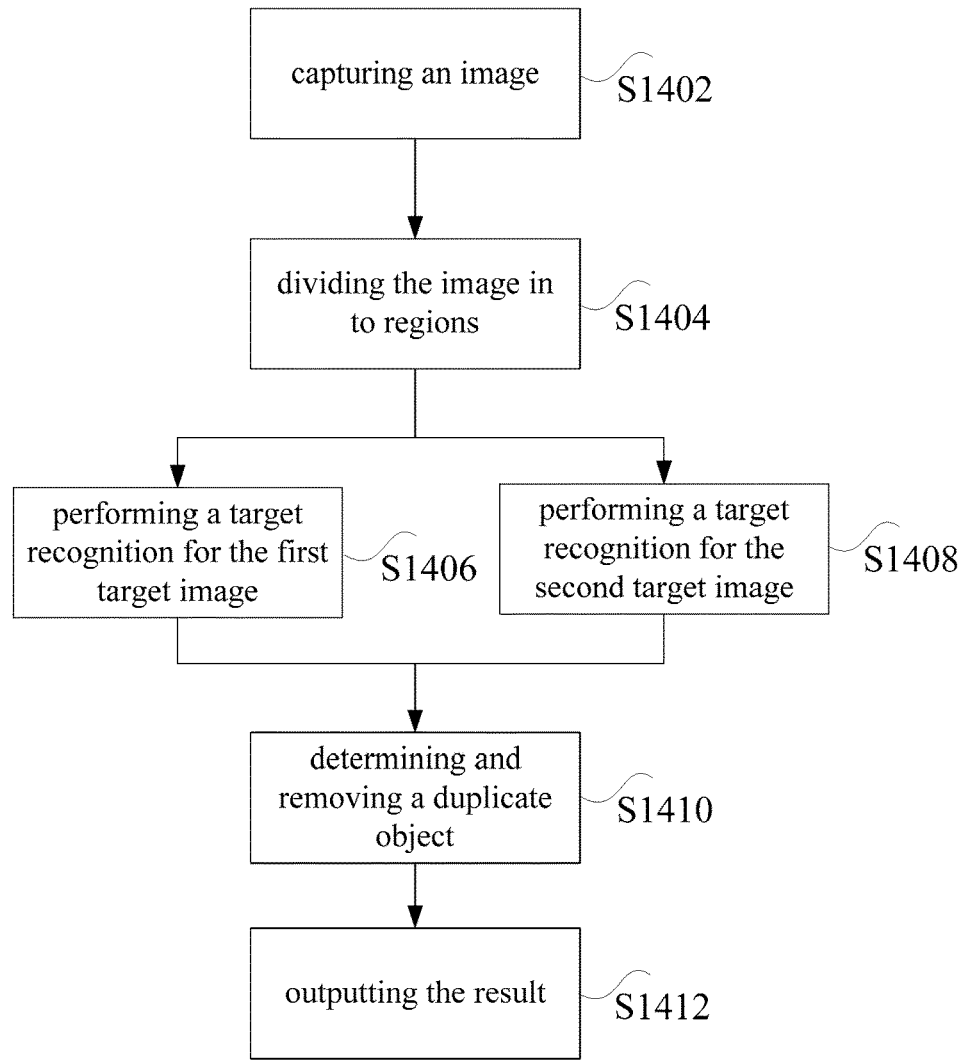
FIG. 14 is a flow chart of an image processing method according to the second embodiment of the present application.

FIG. 14 is a flow chart of an image processing method according to the second embodiment of the present application. The embodiment can be a preferable implementation of the embodiment shown in FIG. 13. As shown in FIG. 14, the method includes following steps:

Step S1402, capturing an image.

The image is the above-mentioned image to be processed.

Step S1404, dividing the image into regions.

The image is divided into a first target image and a second target image according to the configuration (or thickness) of an optical filter. The first target image is the image formed on the photosensitive chip through a thicker region of the optical filter; the second image is the image formed on the photosensitive chip through a thinner region of the optical filter.

Step S1406, performing a target identification for the first target image.

Target identification is the identification of the object to be detected.

Step S1408, performing a target identification for the second target image.

Step S1410, determining and removing duplicate parts.

The image of duplicate parts in the first target image and the second target image is removed based on form and appearance characteristics (i.e., the processing of removing duplicates).

Step S1412, outputting a result.

According to the image processing method of the embodiment, the first target image and the second target image (images obtained respectively through the thicker portion and the thinner portion of the optical filter) are obtained by dividing the image into regions, the object to be detected in the first target image and the second target image is identified, and determining and removing the image of duplicate parts, thus the image ultimately obtained is more clear.

Preferably, the optical filter is reset to a predetermined initial position each time before an initial image is obtained. As the position of the optical filter is not fixed when shooting different scenes (it is determined by the proximal end and the distal end of the object to be detected), the position of the optical filter with respect to the object to be detected needs to be adjusted when shooting the different scenes. For a camera configured for a fixed position, the position of the optical filter can be adjusted to a fixed effective position. For a camera without a fixed position, the optical filter can be reset to a predetermined initial position each time before an initial image is obtained.

The image processing method provided in the present application is now explained with reference to two specific application scenarios below.

Figure 15:
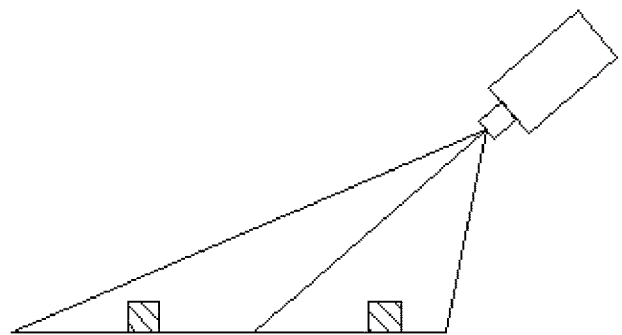
FIG. 15 is a schematic view of an application of an image processing method according to embodiments of the present application in intelligent transportation.

FIG. 15 is a schematic view illustrating an application of the image processing method according to embodiments of the present application in intelligent transportation. A camera applied in intelligent transportation have to be mounted in a tilted way with respect to the scene being monitored, in which case, as the scene targeted by the camera contains both a proximal scene and a distal scene, the camera may be unable to focus simultaneously on both. With a step-shaped optical filter (or an optical filter having a uniform thickness) configured in the camera, the proximal scene and the distal scene can both be within the DOF of the camera. In such a case, the optical filter can be adjusted to an optimal position for the scene being shot during its first use, and may not need to be adjusted again in subsequent use. The image processing method of the present application can be configured to process images shot of traffic, vehicles, or roads to make the images clearer.

Figure 16:
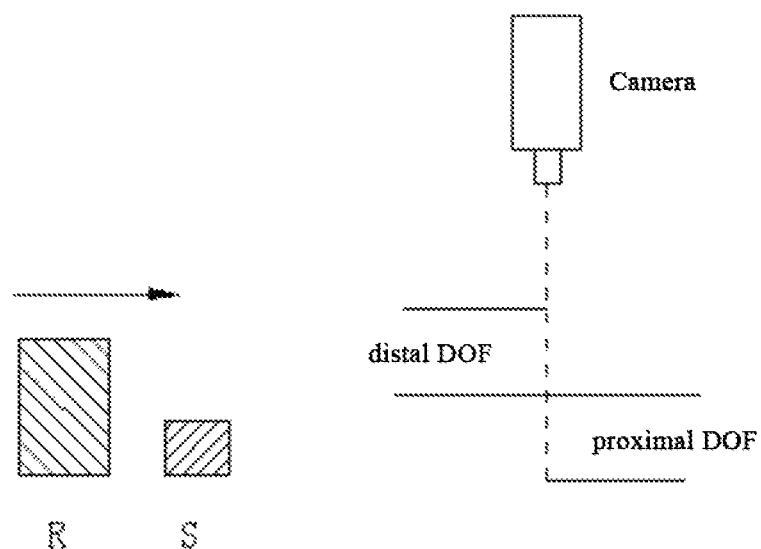
FIG. 16 is a schematic view of an application of an image processing method according to embodiments of the present application in an assembly line.

FIG. 16 is a schematic view illustrating an application of the image processing method according to embodiments of the present application in an assembly line. As shown in FIG. 16, on the left side, a cross section view of objects to be detected is provided, including an object R to be detected and an object S to be detected, wherein the height of the object R to be detected is larger than that of the object S to be detected. A camera is mounted above the assembly line (an object to be detected having a relatively high height will be regarded as an object at a proximal end with respect to the camera, and an object to be detected having a relatively low height will be regarded as an object at a distal end with respect to the camera). When objects to be detected pass the field of view of the camera, functions such as counting, quality detection, and bar-code identification can be implemented through an intelligent algorithm. However, when the objects to be detected have different heights and the variation thereof exceeds the DOF of the camera, a step-shaped optical filter (or an optical filter having a uniform thickness) can then be used in the camera, so that a part of photosensitive pixels in the camera monitors farther objects, and another part of the photosensitive pixels monitor closer objects. All the objects to be detected that pass within the total DOF can be recognized and monitored effectively. When an image of an object to be detected is obtained, the image processing method in embodiments of the present application can be used to obtain a clearer image of the object to be detected.

An image processing method according to another embodiment of the present application is further provided below. The method is applied to image to be processed shot by a camera with an optical filter having a uniform thickness.

The image processing method according to this embodiment includes:

Step S1702, obtaining a first target image and a second target image respectively, wherein the first target image is one of the image to be processed that is formed on a photosensitive chip through an optical lens and an optical filter, and the second target image is one of the image to be processed that is formed on the photosensitive chip through the optical lens but not through the optical filter, wherein the image to be processed is an image of a target object to be detected shot by a lens including the optical lens, the photosensitive chip, and the optical filter which is disposed between the optical lens and the photosensitive chip and has a uniform thickness.

Step S1704, determining whether there is any overlapping area between an image of the target object to be detected in the first target image and an image of the target object to be detected in the second target image.

Step S1706, performing de-duplication to the overlapping area in the image to be processed if it is determined that there is any overlapping area between an image of the target object to be detected in the first target image and an image of the target object to be detected in the second target image.

The image processing method according to this embodiment solves the technical problem in the relevant art that the image shot by a camera is not clear because the camera has a relatively small DOF. Further, by performing de-duplication to the overlapping area between the image formed through the optical filter and the image formed not through the optical filter of the image to be processed, it can be ensured that different areas of the image ultimately obtained correspond to object points with different object distances, that is, the image obtained includes image points on different areas of the photosensitive chip formed respectively by far-object-distance object points and near-object-distance object points. As the DOF of the lens is increased, the image obtained is made clearer. The image processing method according to this embodiment includes: obtaining a first target image and a second target image respectively, wherein the first target image is a part of an image to be processed that is formed on the photosensitive chip through the optical lens and the optical filter, and the second target image is a part of the image to be processed that is formed on the photosensitive chip through the optical lens but not through the optical filter, wherein the image to be processed is an image of the target object to be detected shot by the lens including the optical lens, the photosensitive chip and the optical filter disposed between the optical lens and the photosensitive chip and having a uniform thickness; determining whether there is any overlapping area between an image of the target object to be detected in the first target image and an image of the target object to be detected in the second target image; and performing de-duplication to the overlapping area in the image to be processed if it is determined that there is any overlapping area between an image of the target object to be detected in the first target image and an image of the target object to be detected in the second target image.

It should be noted that the steps illustrated in the flow charts of the drawings can be performed in a computer system of, e.g., a set of computer executable instructions. In addition, although logic sequences are illustrated in the flow charts, the steps shown or described can be performed in a sequence other than the sequence described here.

The numbering of the embodiments in the present application are merely intended for description, an does not represent preferences of the embodiments.

In each of the above embodiments of the present application, emphasis is placed on different aspects. For aspects that are not described in detail in one embodiment, one can refer to related parts of other embodiments.

In several embodiments provided by the present application, it should be appreciated that the technical contents disclosed can be implemented in other manners. In the present application, the apparatus embodiments described above are merely illustrative. For example, the division of units may be a kind of division of logical functions, but in practice, can be divided in other ways. For example, a plurality of units or components can be combined or integrated into another system, or some features can be omitted or not executed. Further, the inter-coupling or direct coupling or communicative connection illustrated or discussed can be indirect coupling or communicative connection between units or modules through some interfaces and can be electrical or otherwise.

Units described as separate components can be separated physically and can be not separated physically. A component illustrated as a unit can be a physical unit and can be not a physical unit, that is, it can be located in one place or can be distributed on multiple units. A part of or all of the units can be selected according to actual needs to fulfill the purpose of the solution of an embodiment.

In addition, the functional units in various embodiments of the present application can be integrated into one processing unit, or exist physically as separate units. Or, two or more units can be integrated into one unit. The integrated unit can be implemented in the form of hardware or a software functional unit.

The integrated unit can be stored in a computer readable storage medium when it is implemented as a software functional unit and sold or used as an independent product. Based on this understanding, the essence of the technical solution of the present application or the parts that contribute to the prior art, or a part of or all of the technical solution can be embodied as a software product that is stored in a storage medium and contains several instructions enabling a computer device (which can be a personal computer, a server, or a network device) to execute a part of or all of the steps of a method described in various embodiments of the present application. The above-mentioned storage medium includes various mediums capable of storing program code, such as flash memory, read only memory (ROM), random access memory (RAM), portable disks, magnetic disks, and compact disks.

In addition, an application program is further provided according to an embodiment of the present application. The application program is configured to perform image processing methods provided in embodiments of the present application when being executed.

An image processing method provided by the first embodiment of the present application includes:

obtaining a first target image and a second target image respectively, wherein the first target image is a part of an image to be processed that is formed on a photosensitive chip through an optical lens and a first filter portion, and the second target image is a part of the image to be processed that is formed on the photosensitive chip through the optical lens and a second filter portion, wherein the image to be processed is an image of a target object to be detected shot with a lens including the optical lens, the photosensitive chip and an optical filter that is disposed between the optical lens and the photosensitive chip and includes the first filter portion and the second filter portion, the first filter portion having a thickness greater than that of the second filter portion;

determining whether there is any overlapping area between an image of the target object to be detected in the first target image and an image of the target object to be detected in the second target image; and performing de-duplication to the overlapping area in the image to be processed if it is determined that there is any overlapping area between the image of the object to be detected in the first target image and that in the second target.

In a specific implementation of the present application, before obtaining the first target image and the second target image, the method further includes:

obtaining a first proportion and a second proportion respectively, wherein the first proportion is the proportion of the image of object to be detected in a first region of the image to be processed, and the second proportion is the proportion of the image of object to be detected in a second region of the image to be processed;

determining if the difference between the first proportion and the second proportion reaches a predetermined threshold, wherein the first proportion is larger than the second proportion; and adjusting the position of the optical filter to increase the second proportion and re-obtaining the image to be processed if it is determined that the difference between the first proportion and the second proportion reaches the predetermined threshold.

In a specific implementation of the present application, adjusting the position of the optical filter to increase the second proportion includes:

determining a target movement amount according to the first proportion, the second proportion, the area of the first region, and the area of the second region; and moving the optical filter towards a target direction by the target movement amount, wherein the target direction is the direction from the first region to the second region.

An image processing method according to the second embodiment of the present application includes:

obtaining a first target image and a second target image respectively, wherein the first target image is a part of an image to be processed that is formed on a photosensitive chip through an optical lens and an optical filter, and the second target is one of the image to be processed that is formed on the photosensitive chip through the optical lens but not through the optical filter, wherein the image to be processed is an image of a target object to be detected shot with a lens including the optical lens, the photosensitive chip, and an optical filter that is disposed between the optical lens and the photosensitive and has a uniform thickness;

determining whether there is any overlapping area between an image of the target object to be detected in the first target image and an image of the target object to be detected in the second target image; and performing de-duplication to the overlapping area in the image to be processed if it is determined that there is an overlapping area between the image of the object to be detected in the first object image and that in the second target image.

The description of the application program embodiment is relatively brief as it is substantially identical to the method embodiments, and for the related parts, one need only refer to the method embodiments.

It can be easily seen that the DOF of an camera can be increased by executing the application program provided in this embodiment of the present application, so that object points, whether they have a large or small object distance, can be imaged clearly on the photosensitive chip of the camera's lens.

In addition, a storage medium is further provided according to an embodiment of the present application. The storage medium is configured for storing an application program which is configured for performing image processing methods provided in embodiments of the present application when being executed.

An image processing method according to the first embodiment of the present application includes:

obtaining a first target image and a second target image respectively, wherein the first target image is a part of an image to be processed that is formed on a photosensitive chip through an optical lens and a first filter portion, and the second target image is a part of the image to be processed that is formed on the photosensitive chip through the optical lens and a second filter portion, wherein the image to be processed is an image of a target object to be detected shot with a lens including the optical lens, the photosensitive chip and an optical filter that is disposed between the optical lens and the photosensitive chip and includes the first filter portion and the second filter portion, the first filter portion having a thickness greater than that of the second filter portion;

determining whether there is any overlapping area between an image of the target object to be detected in the first target image and an image of the target object to be detected in the second target image; and performing de-duplication to the overlapping area in the image to be processed if it is determined that there is an overlapping area between the image of the object to be detected in the first target image and that in the second target.

In a specific implementation of the present application, before obtaining the first target image and the second target image, the method further includes:

obtaining a first proportion and a second proportion respectively, wherein the first proportion is the proportion of the image of object to be detected in a first region of the image to be processed, and the second proportion is the proportion of the image of object to be detected in a second region of the image to be processed;

determining if the difference between the first proportion and the second proportion reaches a predetermined threshold, wherein the first proportion is larger than the second proportion; and adjusting the position of the optical filter to increase the second proportion and re-obtaining the image to be processed if it is determined that the difference between the first proportion and the second proportion reaches the predetermined threshold.

In a specific implementation of the present application, adjusting the position of the optical filter to increase the second proportion includes:

determining a target movement amount according to the first proportion, the second proportion, the area of the first region, and the area of the second region; and moving the optical filter towards a target direction by the target movement amount, wherein the target direction is the direction from the first region to the second region.

An image processing method according to the second embodiment of the present application includes:

obtaining a first target image and a second target image respectively, wherein the first target image is a part of an image to be processed that is formed on a photosensitive chip through an optical lens and an optical filter, the second target is one of the image to be processed that is formed on the photosensitive chip through the optical lens but not through the optical filter, wherein the image to be processed is an image of a target object to be detected shot with a lens including the optical lens, the photosensitive chip, and the optical filter which is disposed between the optical lens and the photosensitive and has a uniform thickness;

determining whether there is any overlapping area between an image of the target object to be detected in the first target image and an image of the target object to be detected in the second target image; and performing de-duplication to the overlapping area in the image to be processed if it is determined that there is an overlapping area between an image of the target object to be detected in the first target image and an image of the target object to be detected in the second target image.

The description of the storage medium embodiment is relatively brief as it is substantially identical to the method embodiments, and for the related parts, one need only refer to the method embodiments.

It can be easily seen that the DOF of an camera can be increased by executing the application program stored in the storage medium provided in this embodiment of the present application, so that object points, whether they have a large or small object distance, can be imaged clearly on the photosensitive chip of the camera's lens.

What has been described above are merely preferred implementations of the present application. It should be noted that, modifications and alternations can be made by those skilled in the art without departing from the principle of the present application, and all those modifications and alternations shall also be regarded as falling within the protection scope of the present application.

The invention claimed is:

1. A camera, comprising:
an optical lens;
a photosensitive chip; and
an optical filter comprising a first filter portion and a second filter portion, the optical filter being disposed between the optical lens and the photosensitive chip, wherein a first object point is imaged on the photosensitive chip through the optical lens and the first filter portion, and a second object point is imaged on the photosensitive chip through the optical lens and the second filter portion, the first filter portion having a thickness greater than that of the second filter portion,
wherein the area ratio between an incidence plane of the first filter portion and an incidence plane of the second filter portion is the ratio between a field of view of a distal region of depth of field (DOF) and a field of view of a proximal region of DOF.

2. The camera of claim 1, wherein the first filter portion and the second filter portion constitute a step-shaped structure.

3. The camera of claim 2, wherein the optical filter comprises a plurality of transparent flat optical filters, wherein the plurality of transparent flat optical filters are glued by an optical adhesive to form the step-shaped structure.

4. The camera of claim 2, wherein the optical filter comprises a transparent optical filter with the step-shaped structure.

5. The camera of claim 1, wherein the optical filter is controlled and moved to a target position, wherein at the target position, the imaging optical path of the first object point goes through the first filter portion and the imaging optical path of the second object point goes through the second filter portion.

6. The camera of claim 1, wherein a surface of the photosensitive chip is provided with protection glass, and the optical filter is glued to a surface of the protection glass.

7. The camera of claim 1, wherein an incidence plane and an exit plane of the optical filter are coated with an anti-reflection film and/or infrared cut-off film.

8. A camera, comprising:
an optical lens;
a photosensitive chip; and
an optical filter disposed between the optical lens and the photosensitive chip, wherein a first object point is imaged on the photosensitive chip through the optical lens and the optical filter, and a second object point is imaged on the photosensitive chip through the optical lens but not through the optical filter.

9. The camera of claim 8, wherein the central axis of the optical filter is parallel to the optical axis of the optical lens and spaced from the optical axis by a predetermined distance.

10. The camera of claim 8, wherein the optical filter is controlled and moved to a target position, wherein at the target position, the imaging optical path of the first object point goes through the optical filter and the imaging optical path of the second object point does not go through the optical filter.

11. A package inspection system, comprising the camera of claim 1.

12. An image processing method, comprising:
obtaining a first target image and a second target image, wherein the first target image is a part of an image to be processed that is formed on a photosensitive chip through an optical lens and a first filter portion, and the second target image is a part of the image to be processed that is formed on the photosensitive chip through the optical lens and a second filter portion, wherein the image to be processed is an image of a target object to be detected shot with a camera including the optical lens, the photosensitive chip and an optical filter which is disposed between the optical lens and the photosensitive chip and comprises the first filter portion and the second filter portion, the first filter portion having a thickness greater than that of the second filter portion;

determining whether there is any overlapping area between an image of the target object to be detected in the first target image and an image of the target object to be detected in the second target image; and performing de-duplication to the overlapping area in the image to be processed if it is determined that there is an overlapping area between an image of the target object to be detected in the first target image and an image of the target object to be detected in the second target image.

13. The method of claim 12, wherein before obtaining the first target image and the second target image, the method further comprises:

obtaining a first proportion and a second proportion, wherein the first proportion is the proportion of the image of the target object to be detected in a first region of the image to be processed, and the second proportion is the proportion of the image of the target object to be detected in a second region of the image to be processed;

determining whether the difference between the first proportion and the second proportion reaches a predetermined threshold, wherein the first proportion is larger than the second proportion; and adjusting the position of the optical filter to increase the second proportion and re-obtaining the image to be processed if it is determined that the difference between the first proportion and the second proportion reaches the predetermined threshold.

14. The method of claim 13, wherein adjusting the position of the optical filter to increase the second proportion comprises:

determining a target movement amount according to the first proportion, the second proportion, the area of the first region and the area of the second region; and moving the optical filter towards a target direction by the target movement amount, wherein the target direction is the direction from the first region to the second region.

15. An image processing method, comprising:

obtaining a first target image and a second target image, wherein the first target image is a part of an image to be processed that is formed on a photosensitive chip through an optical lens and an optical filter, the second target image is a part of the image to be processed that is formed on the photosensitive chip through the optical lens but not through the optical filter, wherein the image to be processed is an image of a target object to be detected shot with a camera comprising the optical lens, the photosensitive chip, and the optical filter which is disposed between the optical lens and the photosensitive chip and has a uniform thickness;

determining whether there is any overlapping area between an image of the target object to be detected in the first target image and an image of the target object to be detected in the second target image; and performing de-duplication to the overlapping area in the image to be processed if it is determined that there is an overlapping area between an image of the target object to be detected in the first target image and an image of the target object to be detected in the second target image.

16. A non-transitory storage medium, which is configured for storing an application program, wherein the application program is configured for performing the image processing method of claim 12 when being executed.

17. A non-transitory storage medium, which is configured for storing an application program, wherein the application program is configured for performing the image processing method of claim 13 when being executed.

18. A non-transitory storage medium, which is configured for storing an application program, wherein the application program is configured for performing the image processing method of claim 14 when being executed.

19. A non-transitory storage medium, which is configured for storing an application program, wherein the application program is configured for performing the image processing method of claim 15 when being executed.

* * * * *